(12) United States Patent
Kraenzel et al.

(10) Patent No.: US 9,002,696 B2
(45) Date of Patent: Apr. 7, 2015

(54) DATA SECURITY SYSTEM FOR NATURAL LANGUAGE TRANSLATION

(75) Inventors: Carl J. Kraenzel, Boston, MA (US); David M. Lubensky, Brookfield, CT (US); Baiju Dhirajlal Mandalia, Boca Raton, FL (US); Cheng Wu, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1064 days.

(21) Appl. No.: 12/956,739

(22) Filed: Nov. 30, 2010

(65) Prior Publication Data

US 2012/0136646 A1 May 31, 2012

(51) Int. Cl.
G06F 17/18 (2006.01)
G06F 17/27 (2006.01)
G06F 17/28 (2006.01)
G10L 13/02 (2013.01)
G10L 15/26 (2006.01)

(52) U.S. Cl.
CPC .......... *G06F 17/289* (2013.01); *G06F 17/2854* (2013.01); *G10L 13/02* (2013.01); *G10L 15/26* (2013.01)

(58) Field of Classification Search
CPC ... G06F 17/28; G06F 17/289; G06F 17/2881; G06F 17/2827; G06F 17/2872; G06F 17/2818; G06F 17/2735; G06F 17/271; G06F 17/2765; G06F 17/2809; G06F 17/2775; G06F 17/2836; G06F 17/2854; G06F 9/4448; G06F 17/2845; G10L 13/043
USPC ............ 704/273, 270.1, 270, 1–10, 277, 275, 704/E15.003, E15.026
See application file for complete search history.

(56) References Cited

U.S. PATENT DOCUMENTS

| | | | | |
|---|---|---|---|---|
| 5,848,386 A | * | 12/1998 | Motoyama | 704/5 |
| 5,884,246 A | * | 3/1999 | Boucher et al. | 704/2 |
| 5,960,080 A | * | 9/1999 | Fahlman et al. | 380/252 |
| 6,208,956 B1 | | 3/2001 | Motoyama | |
| 6,782,356 B1 | * | 8/2004 | Lopke | 704/5 |
| 6,993,473 B2 | | 1/2006 | Cartus | |
| 7,016,844 B2 | * | 3/2006 | Othmer et al. | 704/270.1 |

(Continued)

OTHER PUBLICATIONS

Macherey et al., "An Empirical Study on Computing Consensus Translations from Multiple Machine Translation Systems," in Simard, "Rule-based Translation With Statistical Phrase-based Post-editing," Michel Simard et al., ACL 2007 Second Workshop on Statistical Machine Translation, Prague, Czech Republic, Jun. 23, 2007, pp. 203-206.*

(Continued)

*Primary Examiner* — Abdelali Serrou
(74) *Attorney, Agent, or Firm* — Yee & Associates, P.C.; Lisa J. Ulrich

(57) ABSTRACT

A method, computer system, and computer program product for translating information. The computer system receives the information for a translation. The computer system identifies portions of the information based on a set of rules for security for the information in response to receiving the information. The computer system sends the portions of the information to a plurality of translation systems. In response to receiving translation results from the plurality of translation systems for respective portions of the information, the computer system combines the translation results for the respective portions to form a consolidated translation of the information.

22 Claims, 5 Drawing Sheets

(56) References Cited

U.S. PATENT DOCUMENTS

| | | | |
|---|---|---|---|
| 7,283,950 B2 | 10/2007 | Pournasseh et al. | |
| 7,562,008 B2 | 7/2009 | Chan | |
| 8,145,472 B2* | 3/2012 | Shore et al. | 704/2 |
| 8,271,260 B2* | 9/2012 | Wong et al. | 704/2 |
| 8,566,078 B2* | 10/2013 | Sarikaya et al. | 704/4 |
| 8,676,563 B2* | 3/2014 | Soricut et al. | 704/2 |
| 2003/0065504 A1 | 4/2003 | Kraemer et al. | |
| 2003/0110023 A1* | 6/2003 | Bangalore et al. | 704/5 |
| 2003/0212605 A1* | 11/2003 | Chin et al. | 705/26 |
| 2004/0064317 A1* | 4/2004 | Othmer et al. | 704/260 |
| 2004/0102957 A1 | 5/2004 | Levin | |
| 2006/0116865 A1* | 6/2006 | Cheng et al. | 704/2 |
| 2006/0200339 A1* | 9/2006 | Satake et al. | 704/4 |
| 2007/0050182 A1* | 3/2007 | Sneddon et al. | 704/2 |
| 2007/0225973 A1* | 9/2007 | Childress et al. | 704/211 |
| 2007/0294076 A1 | 12/2007 | Shore | |
| 2008/0154577 A1* | 6/2008 | Kim et al. | 704/2 |
| 2008/0249760 A1* | 10/2008 | Marcu et al. | 704/2 |
| 2008/0300855 A1 | 12/2008 | Alibaig | |
| 2009/0052636 A1* | 2/2009 | Webb et al. | 379/88.14 |
| 2009/0106017 A1* | 4/2009 | D'Agostini | 704/3 |
| 2009/0192782 A1* | 7/2009 | Drewes | 704/3 |
| 2009/0198487 A1* | 8/2009 | Wong et al. | 704/4 |
| 2009/0228263 A1* | 9/2009 | Kamatani et al. | 704/4 |
| 2010/0030553 A1 | 2/2010 | Ball | |
| 2010/0292983 A1* | 11/2010 | Onishi et al. | 704/2 |
| 2011/0097693 A1* | 4/2011 | Crawford | 434/157 |
| 2011/0144974 A1* | 6/2011 | Seo et al. | 704/4 |
| 2012/0016671 A1* | 1/2012 | Jaggi et al. | 704/235 |

OTHER PUBLICATIONS

Rosti "Combining Outputs from Multiple Machine Translation Systems", HLT-NAACL. 2007, pp. 228-235.*

Simard "Rule-based translation with statistical phrase-based post editing", NRC publications Archive, 2007, pp. 1-6.*

Schulzrinne et al., "RPID: Rich Presence Extensions to the Presence Information Data Format (PIDF)", Network Working Group RFC 4480, Jul. 2006, pp. 1-75.

"WebSphere Presence Server", IBM, pp. 1-2, retrieved Nov. 22, 2010 www-01.ibm.com/software/.../about/?S.

Papineni et al., "BLEU: a Method for Automatic Evaluaiton of Machine Translation", Proceedings of the 40th Annual Meeting of the Association for Computational Linguistics (ACL), Philadelphia, Jul. 2002, pp. 311-318.

* cited by examiner

DATA SECURITY SYSTEM FOR NATURAL LANGUAGE TRANSLATION

BACKGROUND

1. Field

The present disclosure relates generally to language translation and, in particular, to increasing privacy in language translation. Still more particularly, the present disclosure relates to a method and apparatus for translating voice from one language to another with a desired amount of privacy for the results.

2. Description of the Related Art

In some cases, translation involves communicating a meaning of a source text language with an equivalent target language. In other instances, translation may involve translating voice into text. This latter type of translation may occur without a change in language. The translation of information may involve using computer translation systems, human translation systems, or a combination of the two.

With the increasing use of translations, computer systems have been increasingly used to automate translation or to aide a human translator. The amount of translation services requested has increased with the growth of mobile devices.

Oftentimes, mobile devices may be used to translate voice into text. For example, a user at a mobile device may input a search by voice and receive results. Additionally, mobile devices may be used to translate voice from one language into voice or text in another language. This type of translation may occur during various business transactions, meetings, and/or other types of events. As the information is exposed to the machine and human translation process, the security and privacy of the content is important to the user.

It was known in the prior art for a computer translation system to receive a spoken sentence, convert it to text based on voice recognition software, generate an initial translation of the spoken sentence after conversion to text, and display the results of the translation.

It was also known in the prior art for a computer translation system to receive a spoken sentence, divide it into portions such as phrases, convert it to text phrases based on voice recognition software, generate an initial translation of the spoken phrases after conversion to text, and display the results of the translation.

SUMMARY

The different illustrative embodiments provide a method, computer system, and computer program product for translating information. The computer system receives the information for a translation. The computer system identifies portions of the information based on a set of rules for security for the information in response to receiving the information. The computer system sends the portions of the information to a plurality of translation systems. In response to receiving translation results from the plurality of translation systems for respective portions of the information, the computer system combines the translation results for the respective portions to form a consolidated translation of the information.

DETAILED DESCRIPTION

Figure 1:
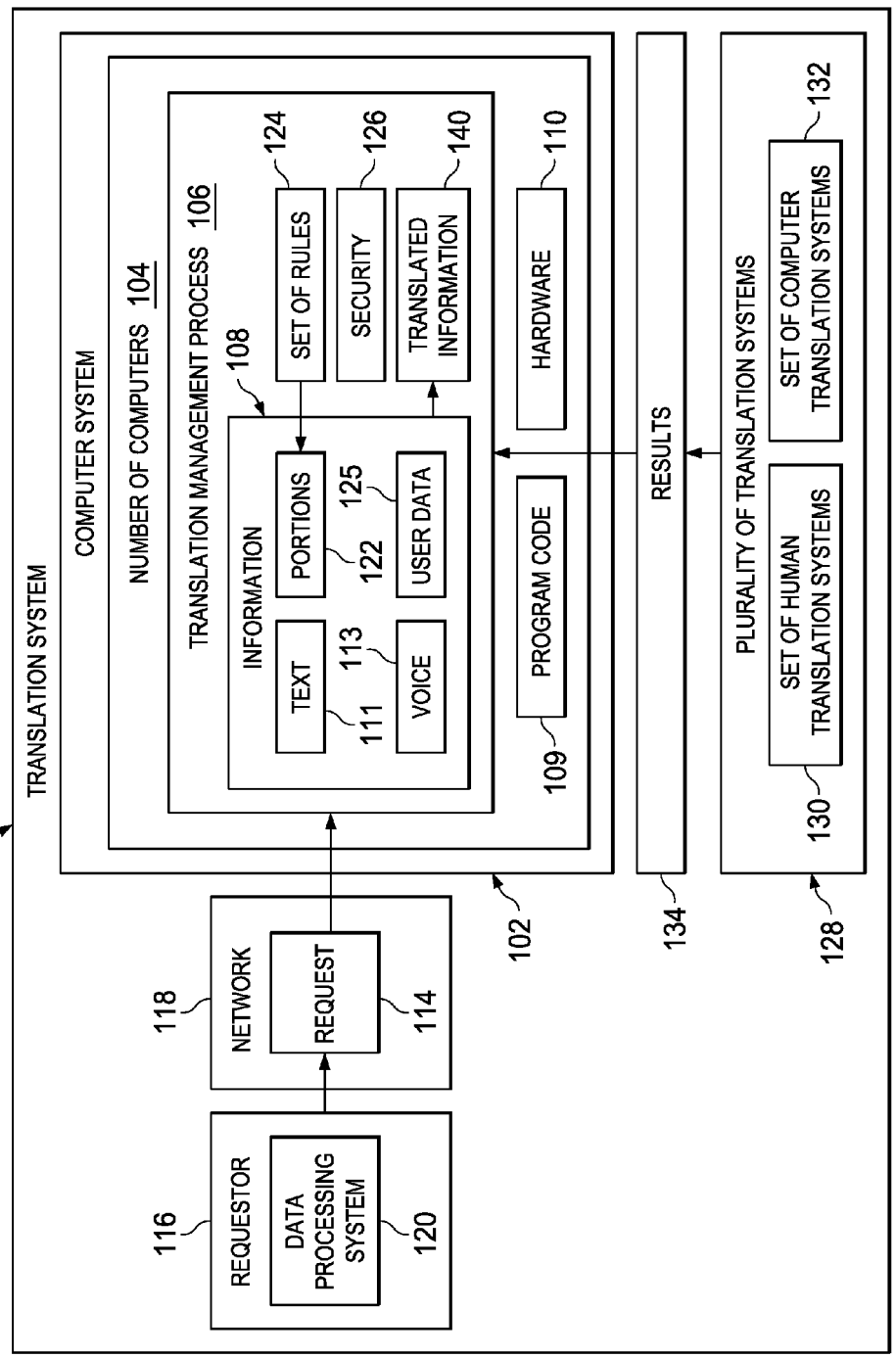
FIG. 1 is an illustration of a translation system in accordance with an illustrative embodiment.

The computer program can be stored on a fixed or portable computer-readable storage device or downloaded from the Internet via a network in which the network includes electrical, optical and/or wireless communication links, routers, switches, etc.

Computer program code for carrying out operations of the present invention may be written in any combination of one or more programming languages, including an object-oriented programming language, such as Java, Smalltalk, C++, or the like, and conventional procedural programming languages, such as the "C" programming language or similar programming languages. The program code may run entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus via a computer-readable RAM such that the instructions, which execute via the processor of the computer or other programmable data processing apparatus, create means for implementing the functions/acts specified in the flowchart and/or block diagram block or blocks. These computer program instructions may also be stored in a computer-readable storage device that can direct a computer or other programmable data processing apparatus, via a RAM, to function in a particular manner, such that the instructions stored in the computer-readable device produce an article of manufacture including instruction means, which implement the function/act specified in the flowchart and/or block diagram block or blocks.

The computer program instructions may also be loaded and installed onto a computer or other programmable data processing apparatus to cause a series of operational steps to be performed on the computer or other programmable apparatus to produce a computer implemented process such that the instructions which run on the computer or other programmable apparatus provide processes for implementing the functions/acts specified in the flowchart and/or block diagram block or blocks.

The different illustrative embodiments recognize and take into account a number of different considerations. For example, the different illustrative embodiments recognize and take into account that information being translated may include information that is considered confidential. The different illustrative embodiments recognize and take into account that the information may include sensitive or personal information. For example, the information being translated may include an interview with a patient regarding medical test results. The medical test results themselves and the identity of the patient may be considered personal and/or confidential. As another example, information for translators may include social security numbers, bank account numbers, credit card numbers, and/or other information that may be considered confidential.

The different illustrative embodiments recognize and take into account that when human translators are used, the human translators may see this personal and/or confidential information. The different illustrative embodiments recognize and take into account that it may be undesirable for these human translators to have exposure to this type of information.

Thus, the different illustrative embodiments provide a method and apparatus for translating information. A computer system receives the information for a translation. The computer system identifies portions in the information based on a set of rules for security for the information in response to receiving the information. The computer system sends the portions to a plurality of translation systems. In response to receiving results from the plurality of translation systems, the computer system forms translated information using the results received.

With reference now to FIG. 1, an illustration of a translation system is depicted in accordance with an illustrative embodiment. As depicted, translation system 100 comprises computer system 102. Computer system 102 has number of computers 104. Number of computers 104 is one or more computers that may be in communication with each other.

Translation management process 106 executes on computer system 102. Translation management process 106 manages the translation of information 108. Translation management process 106 may take the form of program code 109 that is executed by computer system 102. In some illustrative examples, translation management process 106 may be implemented in hardware 110 in computer system 102. In other illustrative examples, translation management process 106 may be implemented using a combination of program code 109 and hardware 110.

In these illustrative examples, information 108 may include at least one of voice 113 and text 111. In other illustrative examples, information 108 may be a document, a video, an audio recording, or some other suitable type of information containing voice 113 and/or text 111.

As depicted, translation management process 106 receives request 114 to translate information 108 from requestor 116 over network 118. Network 118 is the medium used to provide communications links between requestor 116 and number of computers 104 connected together within translation system 100. Network 118 may include connections, such as wire, wireless communication links, or fiber optic cables. Network 118 may take a number of different forms. For example, without limitation, network 118 may be a local area network, a wide area network, the Internet, an intranet, or some other suitable type of network or combination of networks.

In this illustrative example, requestor 116 takes the form of data processing system 120. In particular, requestor 116 may be, for example, without limitation, a mobile phone, a laptop computer, a desktop computer, a personal digital assistant, or some other suitable type of data processing system. In these illustrative examples, request 114 may include information 108 for translation.

In response to receiving information 108 in request 114, translation management program 106 identifies portions 122 in information 108. Portions 122 are meaningfully-divisible portions in these examples. In other words, the portions are ones that have some meaning or logic for translation when portions 122 are meaningfully divisible. Further, each portion is associated with metadata identifying the particular portion. The metadata associated with the different portions may indicate some order or sequence that identifies the order or sequence of the portions in the information. For example, the metadata for a particular portion may be a number in a sequence of numbers in which the sequence of numbers follows the sequence of the portions in information 108.

Portions 122 may be identified using set of rules 124. Set of rules 124 govern how information 108 is split up into portions 122 in these illustrative examples. Set of rules 124 may include, for example, without limitation, a verb following a noun, an object following a verb, an adjective preceding a noun, an adverb preceding and/or following a verb, a set of numerals separated by commas and "and", such as in the form "x, y and z", a topic, a multi-word name identified in a file of multi-word names, a set of characters identified in a file of sets of characters, a set of words identified in a file of sets of words, and/or other suitable types of rules. There can be a maximum number or words per portion, in which case a portion will be subdivided according to another of the rules.

As explained in more detail below, to the extent practical, each spoken sentence is divided into multiple portions, based on set of rules 124, and the different portions are sent to different translators so that one translator does not hear the entire sentence. This will provide a measure of security 126 for information 108. Security 126 for information 108 includes privacy. Different translation systems, including respective different human translators, in plurality of translation systems 128 perform the translations such that the confidentiality of information 108 may be increased. In these illustrative examples, plurality of translation systems 128 may be located in different locations. In this manner, the confidentiality of information 108 may be increased by geographically separating the human translators for the different portions 122 of the same sentence, so the human translators will be less likely to know the human translators for the other portions of the same sentence and therefore, less likely to share their respective information.

In addition, translation management program 106 also may use set of rules 124 to remove user data 125 from information 108. User data 125 may be removed before forming portions 122 or after forming portions 122. In these illustrative examples, user data 125 may be any data that is associated with the user. For example, sensitive user data 125 may include, for example, at least one of a name, a social security number, a phone number, a home address, a work address, an e-mail address, a credit card number, bank account number, and/or any other information that may be associated with a particular user. Translation management program 106 recognizes this sensitive data based on the respective formats of this sensitive data.

In these illustrative examples, translation management program 106 sends portions 122 to plurality of translation systems 128. In these illustrative examples, each of the translation systems 128 includes at least one human translator 130 and at least one computer translation systems 132, although alternately, there can be a single computer translation system to support all of the human translators. In the case of spoken information (which the translation management program converted to text, divided into portions and sent to the different computer translation systems), the respective computer translation system performs the initial translation of each spoken portion after conversion to text, and displays this translation to a human translator to correct/edit it.

The human translator then corrects/edits in text form the text portion translated by the computer translation system, and then directs the computer translation system to send the translated text portion as corrected/edited by the humans back to the translation management program. When the translation management program receives all the translated text portions as corrected/edited by the human translators, for all the portions of each spoken sentence, the translation management program combines the translated text portions as corrected/edited by the human translators. The translation management program knows which portions to combine in which order based on the metadata associated with the different portions. Finally, the translation management program supplies the combined translated text to a voice synthesizer to audibly play the translated sentence to the other participant in the conversation.

In the case of information which is initially supplied in text form, and which the translation management program divided into portions and sent to the different computer translation systems, the respective computer translation system performs the initial translation of the text and displays this translation to a human translator to correct/edit it.

The human translator then corrects/edits in text form the text portion translated by the computer translation system, and then directs the computer translation system to send the translated text portion as corrected/edited by the humans back to the translation management program. When the translation management program receives all the translated text portions as corrected/edited by the human translators, for all the portions of each spoken sentence, the translation management program combines the translated text portions as corrected/edited by the human translators. The translation management program knows which portions to combine in which order based on the metadata associated with the different portions. Finally, the translation management program displays the combined translated text to the user.

In these illustrative examples, a human translation system in set of human translation systems 130 may comprise a human translator. The human translation system also may include a computer used by the human translator. A computer translation system in set of computer translation systems 132 comprises one or more computers in these illustrative examples.

In these depicted examples, portions 122 are identified in a manner such that a human translator in set of human translation systems 130 does not see the context necessary to understand what information belongs to what users. For example, one portion in portions 122 may include the identification of a user, while another portion in portions 122 includes the birth date of the user. Yet, another portion may include an address for the user. Translation management program 106 identifies this data based on templates or pre-identified formats for addresses, dates, and/or other types of data.

These three different portions 122 may be sent to different human translation systems or computer translation systems such that no one translation system has all of the information. The division of information 108 into portions 122 is made such that the sending of portions 122 to plurality of translation systems 128 increases the confidentiality of information 108.

In these illustrative examples, a translation system in plurality of translation systems 128 translates portions 122 to form results 134. Results 134 also may be referred to as translation results. Plurality of translation systems 128 sends results 134 to translation management process 106. In these illustrative examples, a result in results 134 may correspond to a portion in portions 122. In other words, each result in results 134 is a translation of a corresponding portion in portions 122.

When received by translation management program 106, the translation management program combines the results 134 to form translated information 140. For example, translation management program 106 assigns each portion in portions 122 with a sequential number for the portion that follows the sequence of the portions in information 108 that is attached to the portion in metadata. This metadata is also attached to the translated portion for each portion. The translated portions are then combined using the metadata in an order dictated by the sequence number to form translated information 140. After translated information 140 is created, translated information 140 may then be returned to requestor 116.

The illustration of translation system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

Figure 2:
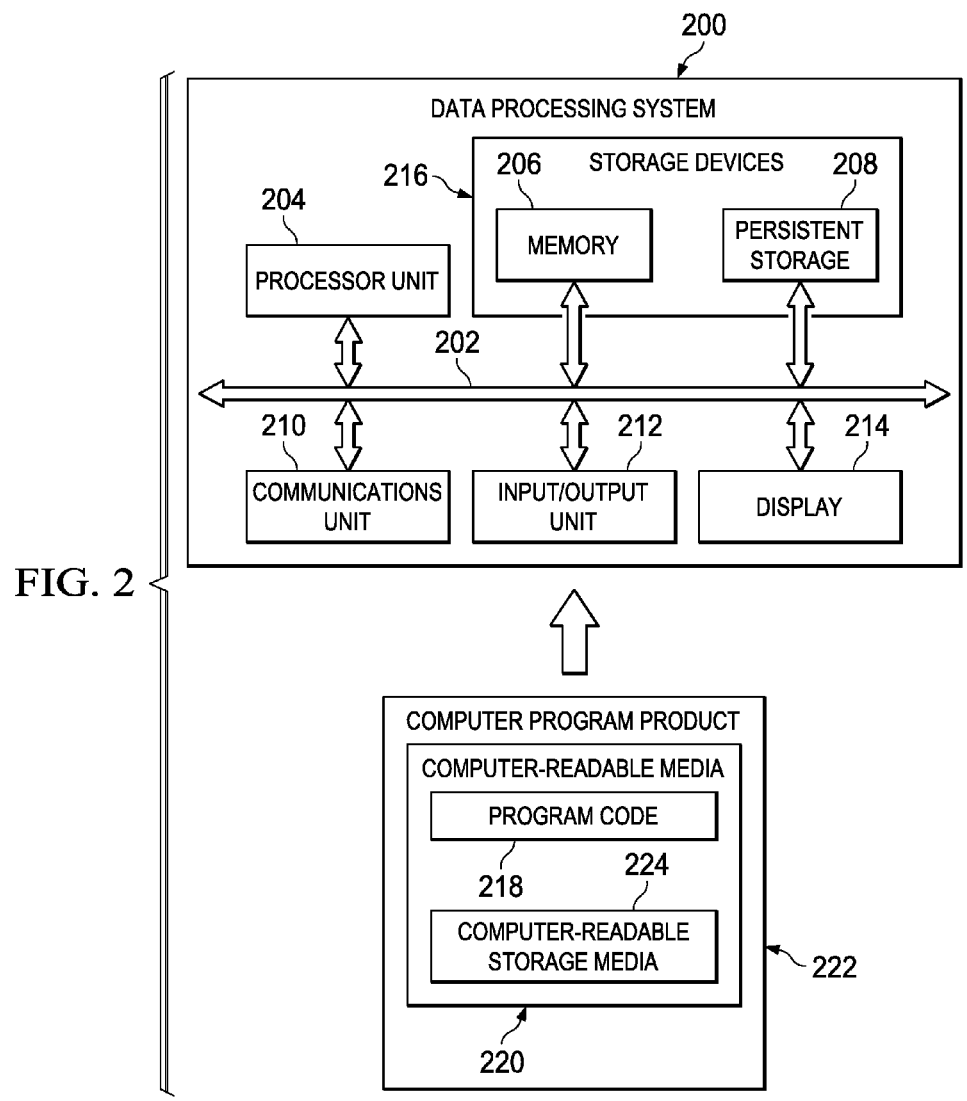
FIG. 2 is an illustration of a data processing system in accordance with an illustrative embodiment.

Turning now to FIG. 2, an illustration of a data processing system is depicted in accordance with an illustrative embodiment. In this illustrative example, one or more of number of computers 104 in FIG. 1, data processing system 120, and/or one or more of the computers in set of computer translation systems 132 may be implemented using data processing system 200. As depicted, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a central processing unit (CPU), a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware, such as disk storage, that is capable of storing information, such as, for example, without limitation, data, program code in functional form, and/or other suitable information either on a temporary basis and/or a permanent basis. Storage devices 216 may also be referred to as computer-readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. Persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for running by processor unit 204. The processes of the different embodiments may be performed by processor unit 204 using computer implemented instructions, which may be located in a memory, such as memory 206.

These instructions are referred to as program code, computer-usable program code, or computer-readable program code that may be read and run by a processor in processor unit 204. The program code in the different embodiments may be embodied on different physical or computer-readable storage media, such as memory 206 or persistent storage 208.

Program code 218 is located in a functional form on computer-readable media 220 that is selectively removable and may be loaded onto or transferred to data processing system 200 for running by processor unit 204. Program code 218 and computer-readable device 220 form computer program product 222 in these examples. In one example, computer-readable device 220 may be computer-readable storage device 224. Computer-readable storage device 224 may include, for example, an optical or magnetic disk that is inserted or placed into a drive or other device that is part of persistent storage 208 for transfer onto a storage device, such as a hard drive, that is part of persistent storage 208.

Computer-readable storage device 224 also may take the form of a persistent storage, such as a hard drive, a thumb drive, or a flash memory, that is connected to data processing system 200. In some instances, computer-readable storage device 224 may not be removable from data processing system 200.

Alternatively, program code 218 may be transferred to data processing system 200 using communications links, such as wireless communications links, optical fiber cable, coaxial cable, a wire, and/or any other suitable type of communications link. In other words, the communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

As another example, a storage device in data processing system 200 is any hardware apparatus that may store data. Memory 206, persistent storage 208, and computer-readable device 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

Figure 3:
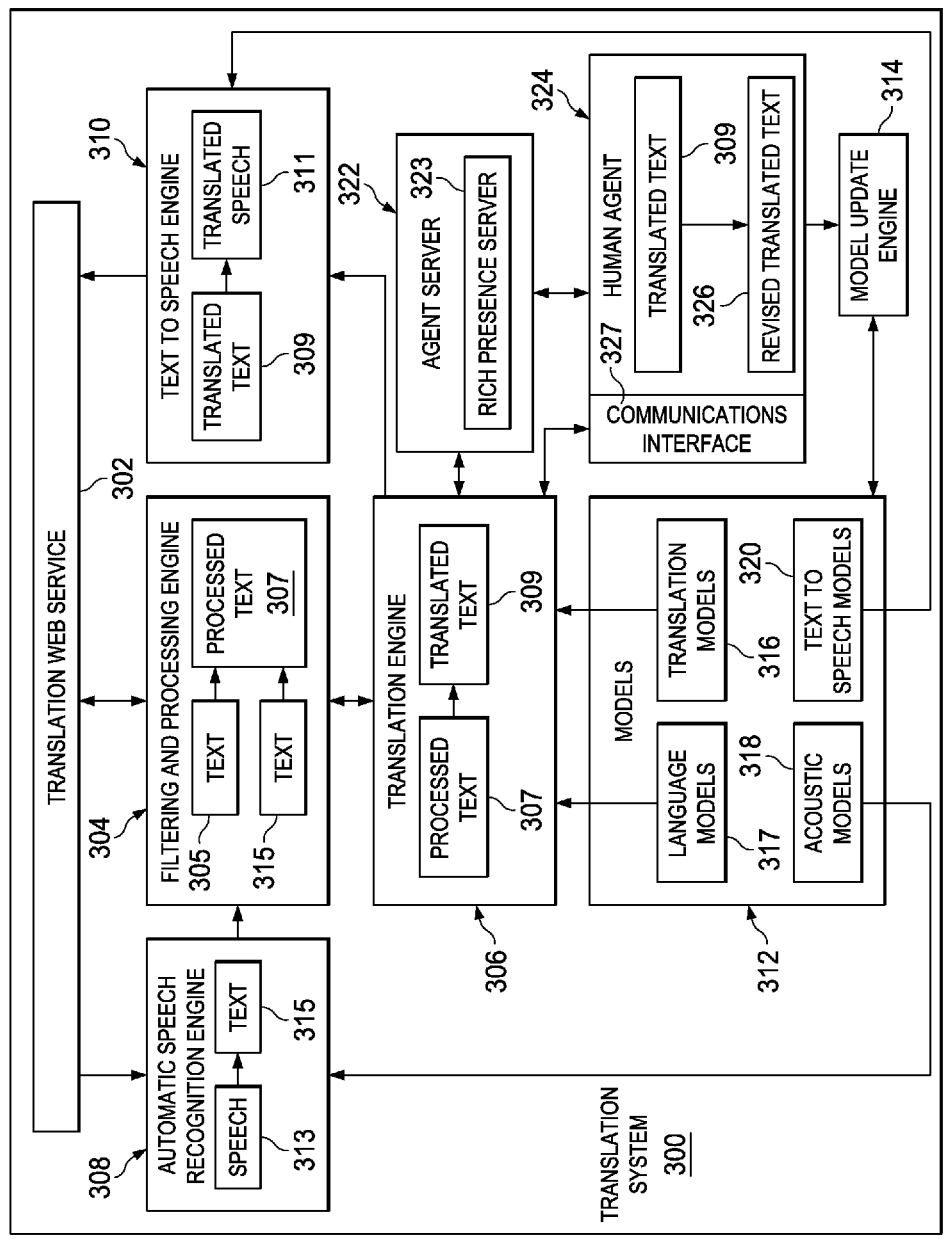
FIG. 3 is an illustration of a translation system in accordance with an illustrative embodiment.

With reference now to FIG. 3, an illustration of a translation system is depicted in accordance with an illustrative embodiment. In this illustrative example, translation system 300 is an example of one implementation of translation system 100 in FIG. 1. As depicted, translation system 300 includes translation web service 302, filtering and processing engine 304, translation engine 306, automatic speech recognition engine 308, text to speech engine 310, models 312, and model update engine 314.

In this illustrative example, translation web service 302 is a web service that provides translation services, such as, for example, text to text translation or speech to speech translation between two different languages. In particular, translation web service 302 interfaces with filtering and processing engine 304, translation engine 306, automatic speech recognition engine 308, text to speech engine 310, and models 312 to provide these types of translation services.

For example, translation web service 302 identifies information that needs to be translated. This information may be text, such as text 111 in FIG. 1, and/or speech, such as voice 113 in FIG. 1. The source of the information may be, for example, user input, a program, or some other suitable source.

In this depicted example, filtering and processing engine 304 receives text 305 for processing through translation web service 302. In this illustrative example, filtering and processing engine 304 divides text 305 into portions, such as portions 122 in FIG. 1, for processing. These portions may be formed based on, for example, set of rules 124 in FIG. 1. Further, filtering and processing engine 304 processes text 305 into a form that translation engine 306 can translate. In particular, filtering and processing engine 304 processes text 305 to form processed text 307.

For example, filtering and processing engine 304 normalizes text 305 to form processed text 307. Normalizing text 305 includes, for example, without limitation, replacing slang with a corresponding word or phrase, replacing abbreviations with the corresponding expanded text, removing special characters in the text, expanding shorthand, removing privacy data, removing foreign language characters, removing punctuation, changing whether characters are upper or lower case, removing selected words, and/or performing other steps to normalize text 305.

Translation engine 306 receives processed text 307 from filtering and processing engine 304 and translates processed text 307 into translated text 309. More specifically, translation engine 306 translates processed text 307 from one language into another language to form translated text 309. This translation may be performed using models 312. In particular, translation engine 306 uses language models 317 and translation models 316 to perform the translation of processed text 307 into translated text 309.

In this illustrative example, language models 317 include data for a number of different languages that may be used in translation. For example, language models 317 may include sentence structures for different languages, definitions of words in different languages, verb tenses in different languages, and/or other suitable types of information. Further, language models 317 may also include probabilities for particular sequences of words. For example, a language model in language models 317 may attempt to predict the next word in a phrase of words based on a probability for sequences of words.

Translation models 316 include data for performing the translation. The data may include, for example, a set of rules for translating from one language into another language.

As depicted, translation engine 306 sends translated text 309 back to filtering and processing engine 304. Filtering and processing engine 304 sends translated text 309 to translation web service 302. In some illustrative examples, translation engine 306 sends translated text 309 directly to translation web service 302.

In some illustrative examples, translation web service 302 identifies speech 313 that needs to be translated. Translation web service 302 sends speech 313 to automatic speech recognition engine 308.

Automatic speech recognition engine 308 converts speech 313 to text 315 in real time as the speech is received. Speech 313 and text 315 are in the same language. Automatic speech recognition engine 308 uses acoustic models 318 in models 312 for performing this conversion of speech 313 to text 315. Acoustic models 318 may include statistical representations of distinct sounds that make up a word. For example, the word color may be represented in an acoustic model in acoustic models 318 as "K A H L A X R". Text 315 is then sent to filtering and processing engine 304 for further processing to form processed text 307.

As depicted, when translated text 309 needs to be translated into speech, translation engine 306 sends translated text 309 to text to speech engine 310. Text to speech engine 310 converts translated text 309 to translated speech 311 in real time for a particular language. In other words, both translated text 309 and translated speech 311 are in the same language. In this illustrative example, text to speech engine 310 converts translated text 309 to translated speech 311 using text to speech models 320. In these illustrative examples, text to speech engine 310 may send translated speech 311 directly to translation web service 302. In other illustrative examples, translated speech 311 may be sent to filtering and processing engine 304. Filtering and processing engine 304 then sends translated speech 311 to translation web service 302.

In this illustrative example, when performing the translation of processed text 307, translation engine 306 makes a determination as to whether translated text 309 has a desired quality. The desired quality may be the accuracy of the translation of text 305 in one language to translated text 309 in a different language. As one illustrative example, the quality of translated text 309 with respect to text 305 may be identified using Bilingual Evaluation Understudy (BLEU). Of course, in other illustrative examples, other techniques may be used to determine the quality of the translation.

If translation engine 306 determines that translated text 309 does not have the desired quality for the translation, translation engine 306 contacts agent server 322. In this illustrative example, agent server 322 comprises rich presence server 323. Rich presence server 323 is a server that stores rich presence information for human agents. Rich presence information includes information in addition to an indication of availability, a unique identifier, and a textual note. For example, rich presence information may include information about what a person is doing, a grouping identifier, when a service provided by the person was last used, the type of place a person is in, what types of media communications may remain private, a time zone, and/or other suitable types of information.

For example, rich presence server 323 contains a database of human agents registered with agent server 322 who are able to perform translations. These human agents register with agent server 322 and indicate their capabilities for performing translations, translation skills, preferences for translating between different languages, availability schedules, and/or other suitable types of information.

The human agents may be in locations anywhere in the world. For example, a portion of the human agents registered with rich presence server 323 may be in the United States, while a second portion of the human agents registered with rich presence server 323 may be in various countries throughout Europe. Further, the human agents may register with rich presence server 323 from call center locations, home offices, and/or other types of locations. In some illustrative examples, the human agents may register with rich presence server 323 using a mobile device, such as a personal digital assistant, a laptop, a cell phone, or some other suitable type of mobile device.

Further, rich presence server 323 contains information about the languages for which human agents are registered and which of the human agents are available at any given time. For example, rich presence server 323 may keep track of human agents who log onto translation web service 302. In this illustrative example, translation engine 306 uses the information contained in agent server 322 to send translated text 309 to human agent 324.

As depicted, human agent 324 receives translated text 309 using communications interface 327. Communications interface 327 may comprise a number of processors configured to process various forms of communications. In particular, these processors are configured to receive and send the various information using different forms of communications.

For example, when human agent 324 is at a call center, communications interface 327 may be configured to receive incoming phone calls, voice messages, and/or other types of voice communications. Further, communications interface 327 may also be configured to receive text messages, chat messages, and/or other types of text communications. As one illustrative example, communications interface 327 may include a graphical user interface through which human agent 324 may exchange information with translation engine 306.

In these illustrative examples, human agent 324 makes changes to translated text 309 to form revised translated text 326. Revised translated text 326 has the desired quality for the translation. In other words, human agent 324 makes corrections to translated text 309 to form revised translated text 326.

Human agent 324 then sends revised translated text 326 to translation engine 306 using communications interface 327.

Additionally, in this illustrative example, human agent 324 keeps track of the corrections made by human agent 324 to translated text 309. Human agent 324 sends these corrections to model update engine 314. Model update engine 314 uses the corrections made by human agent 324 to update models 312. For example, model update engine 314 updates translation models 316 and/or language models 317 based on the corrections made by human agent 324. In this manner, models 312 may be updated in real time. In some illustrative examples, model update engine 314 may send information regarding the corrections made by human agent 324 to agent server 322 for storage.

The illustration of translation system 300 in FIG. 3 is not meant to imply physical or architectural limitations to the manner in which the different illustrative embodiments may be implemented. Other components in addition to and/or in place of the ones illustrated may be used. Some components may be unnecessary in some illustrative embodiments. Further, the process of translation described in FIG. 3 is one manner in which translation may be performed. The different components and/or other components in translation system 300 may be configured to perform the translation in some other suitable manner.

Figure 4:
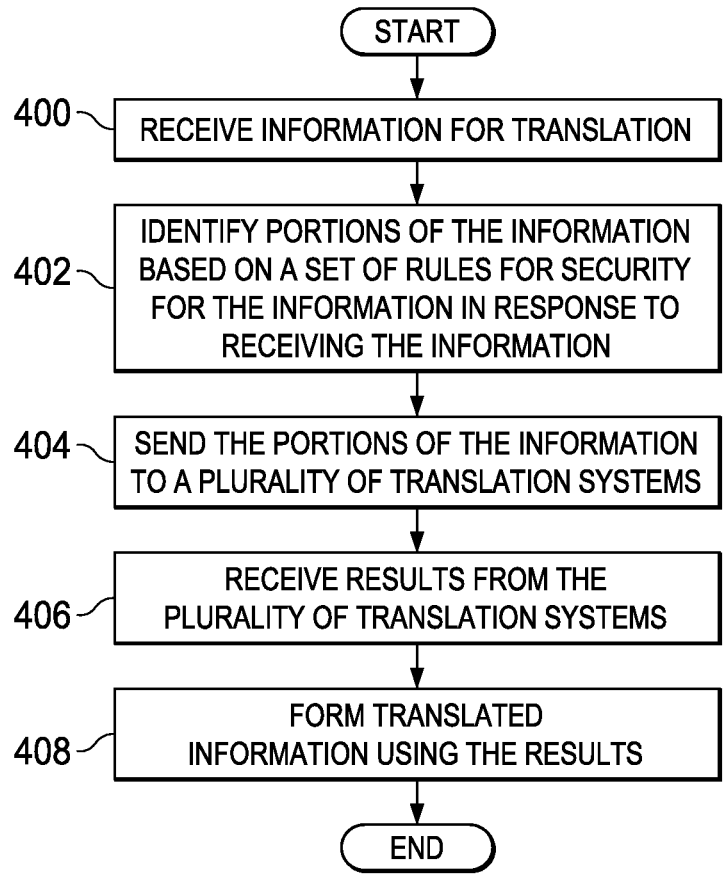
FIG. 4 is an illustration of a flowchart of a process for translating information in accordance with an illustrative embodiment.

With reference now to FIG. 4, an illustration of a flowchart of a process for translating information is depicted in accordance with an illustrative embodiment. The process illustrated in FIG. 4 may be implemented using translation system 100 in FIG. 1.

The process begins by computer system 102 receiving information 108 for translation (step 400). Information 108 may be text 111 and/or voice 113 in this illustrative example. Thereafter, computer system 102 identifies portions 122 of information 108 based on set of rules 124 for security 126 for information 108 in response to receiving information 108 (step 402).

Computer system 102 then sends portions 122 of information 108 to plurality of translation systems 128 (step 404). Plurality of translation systems 128 comprises set of human translation systems 130 and/or set of computer translation systems 132. Thereafter, computer system 102 receives results 134 from plurality of translation systems 128 (step 406). In response to receiving results 134, computer system 102 forms translated information 140 using results 134 (step 408), with the process terminating thereafter. In step 408, computer system 102 combines results 134 for respective portions 122 to form a consolidated translation of the information.

Figure 5:
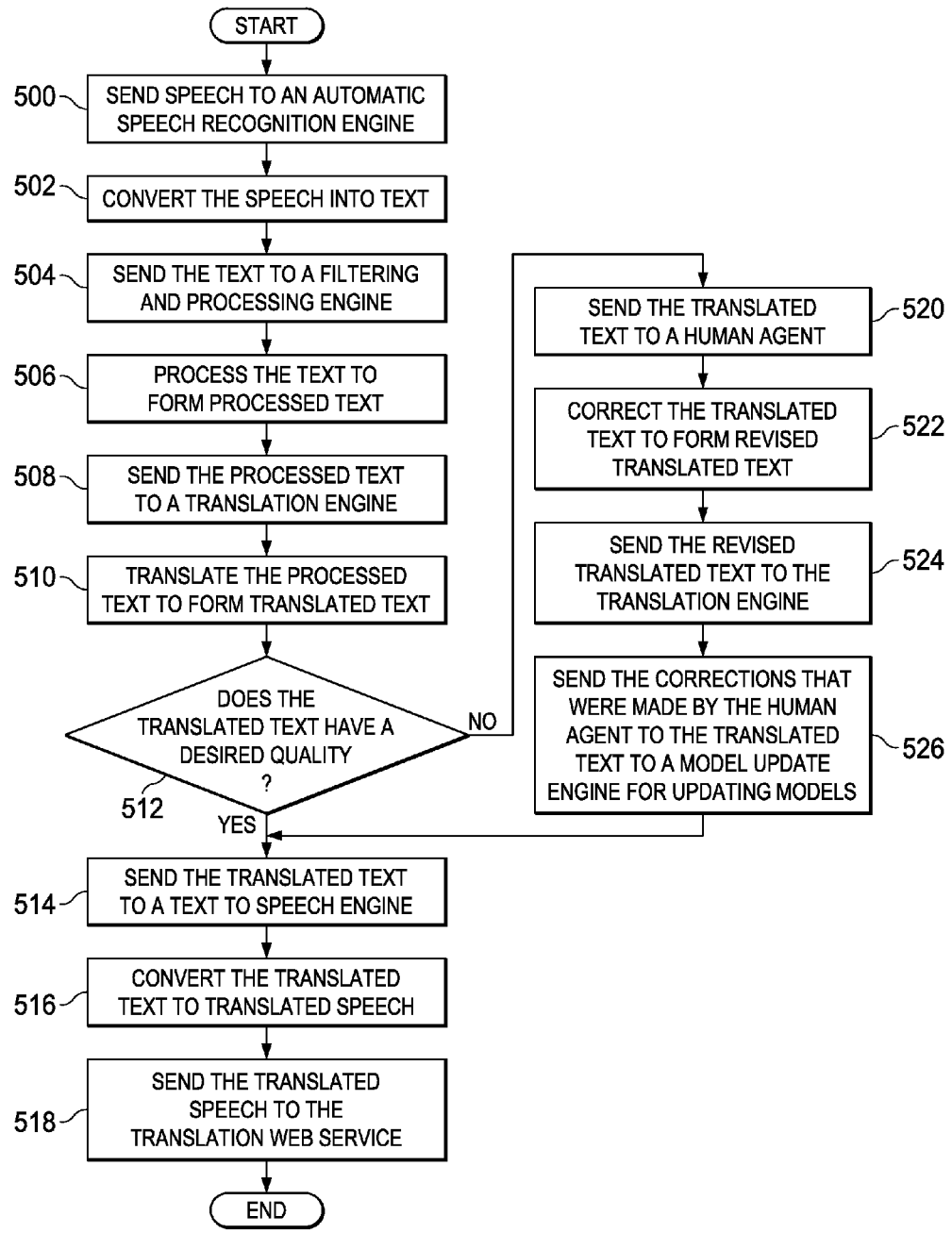
FIG. 5 is an illustration of a flowchart of a process for translating speech to text in accordance with an illustrative embodiment.

With reference now to FIG. 5, an illustration of a flowchart of a process for translating speech to text is depicted in accordance with an illustrative embodiment. The process illustrated in FIG. 5 may be implemented using translation system 300 in FIG. 3.

The process begins by translation web service 302 sending speech 313 to automatic speech recognition engine 308 (step 500). Speech 313 is an example of one implementation for voice 113 in FIG. 1. Speech 313 is speech that needs to be translated from a first language to a second language. Automatic speech recognition engine 308 converts speech 313 into text 315 (step 502). In this illustrative example, automatic speech recognition engine 308 uses acoustic models 318 to convert speech 313 into text 315. Automatic speech recognition engine 308 then sends text 315 to filtering and processing engine 304 (step 504).

Thereafter, filtering and processing engine 304 processes text 315 to form processed text 307 (step 506). In this illustrative example, processing of text 315 in step 506 may include, for example, forming portions of text from text 315 using a set of rules, such as set of rules 124 in FIG. 1. Filtering and processing engine 304 sends processed text 307 to translation engine 306 (step 508).

Translation engine 306 translates processed text 307 to form translated text 309 (step 510). In step 510, translation engine 306 uses translation models 316 and/or language models 317 to translate processed text 307. Translation engine 306 then determines whether translated text 309 has a desired quality for the translation (step 512).

If translated text 309 has the desired quality, translation engine 306 sends translated text 309 to text to speech engine 310 (step 514). Text to speech engine 310 converts translated text 309 to translated speech 311 (step 516). Translated text 309 and translated speech 311 are in the same language. In step 516, text to speech engine 310 converts translated text 309 to translated speech 311 using text to speech models 320. Thereafter, text to speech engine 310 sends translated speech 311 to translation web service 302 (step 518), with the process terminating thereafter.

With reference again to step 512, if translated text 309 does not have the desired quality, translation engine 306 sends translated text 309 to human agent 324 (step 520). In step 520, translation engine 306 may select human agent 324 based on information provided by, for example, agent server 322. Human agent 324 may be selected because human agent 324 is available at the time of the translation and is an expert in translating between the first language and the second language.

Human agent 324 corrects translated text 309 to form revised translated text 326 (step 522). Human agent 324 sends revised translated text 326 to translation engine 306 (step 524). Further, human agent 324 sends corrections that were made by human agent 324 to translated text 309 to model update engine 314 for updating models 312 (step 526). Thereafter, the process proceeds to step 514 as described above, where revised translated text 326 takes the place of translated text 309.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

Thus, the different illustrative embodiments provide a method and apparatus for translating information. A computer system receives the information for a translation. The computer system identifies portions in the information based on a set of rules for security for the information in response to receiving the information. The computer system sends the portions to a plurality of translation systems. In response to receiving results from the plurality of translation systems, the computer system forms translated information using the results received.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-readable device providing program code for use by, or in connection with, a computer or any instruction system.

The computer-readable storage device can be an electronic, magnetic, optical, electromagnetic, infrared, or semiconductor system (or apparatus or device). Examples of a computer-readable device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual running of the program code, bulk storage, and cache memories, which provide temporary storage of at least some program code in order to reduce the number of times code must be retrieved from bulk storage during running of the code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

What is claimed is:

1. A method for translating a natural-language text document, the method comprising:
    a computer system receiving the natural-language text document for translation;
    the computer system dividing each of a plurality of sentences in the document into a plurality of portions based on a set of rules that specify how to divide up each of the plurality of sentences based on content of the plurality of sentences, wherein the computer system avoids disclosure of any of the plurality of sentences in its entirety to a same human translator;
    the computer system translating a first portion of the portions of each of the plurality of sentences to form an initially translated first portion, using a translation engine;
    the computer system sending the portions of each of the plurality of sentences to a plurality of respective, human translators, for correction and translation, wherein none of the plurality of human translators is sent any of the plurality of sentences in its entirety for translation, wherein the step of the computer system sending the portions of each of the plurality of sentences to the plurality of respective, human translators, includes the computer system sending the initially translated first portion along with the first portion; and
    responsive to receiving translations from the plurality of human translators for respective portions of each of the plurality of sentences, the computer system combining the translations for the respective portions to form consolidated translations for each of the plurality of sentences, and updating at least one model used by the translation engine based on corrections made by the human translators.

2. The method of claim 1, further comprising:
    the computer system removing user data from the natural-language text document based on the set of rules prior to sending the plurality of sentences to the plurality of human translators.

3. The method of claim 1, wherein the plurality of respective, human translators, are determined, by the computer system, based on a rule for geographically separating human translators assigned to translate the portions.

4. The method of claim 1, wherein the step of the computer system sending the portions of each of the plurality of sentences to the plurality of respective, human translators, comprises:
    the computer system detecting a presence of potential human translators at translation systems; and
    the computer system using the presence of potential human translators detected from the translation systems to determine the plurality of human translators.

5. The method of claim 1, wherein the portions of each of the plurality of sentences in the natural-language text document are phrases, wherein metadata is associated with each portion of the plurality of portions that identify a sequence of the each portion.

6. The method of claim 1, wherein a requestor requests the translation of the natural-language text document and further comprising:
    the computer system sending the consolidated translations of the plurality of sentences to the requestor.

7. The method of claim 1, wherein the natural-language text document comprises at least one of text, voice, an audio recording, a document, and video.

8. The method of claim 1, wherein the natural-language text document is encrypted.

9. A computer system for translating a natural-language text document, the computer system comprising:
    a CPU, a computer-readable storage device, and a computer-readable memory;
    first program instructions to receive the natural-language text document for translation;
    second program instructions to divide each of a plurality of sentences in the document into a plurality of portions based on a set of rules that specify how to divide up each of the plurality of sentences based on content of the plurality of sentences, and avoid disclosure of any of the plurality of sentences in its entirety to a same human translator;

third program instructions to translate a first portion of the portions of each of the plurality of sentences to form an initially translated first portion, using a translation engine;

fourth program instructions to send the portions of each of the plurality of sentences to a plurality of respective, human translators, for correction and translation, wherein none of the plurality of human translators is sent any of the plurality of sentences in its entirety for translation, wherein the fourth program instructions to send the portions of each of the plurality of sentences to the plurality of respective, human translators, include program instructions to send the initially translated first portion along with the first portion; and fifth program instructions to combine the translations for the respective portions to form consolidated translations for each of the plurality of sentences in response to receiving translations from the plurality of human translators for respective portions of each of the plurality of sentences, and update at least one model used by the translation engine based on corrections made by the human translators, wherein the first program instructions, the second program instructions, the third program instructions, the fourth program instructions, and the fifth program instructions are stored on the computer-readable storage device and executed by the CPU via the computer-readable memory.

10. The computer system of claim 9, further comprising:
sixth program instructions to remove user data from the natural-language text document based on the set of rules prior to sending the plurality of sentences to the plurality of human translators, wherein the sixth program instructions are stored on the computer-readable storage device and executed by the CPU via the computer-readable memory.

11. The computer system of claim 9, wherein the fourth program instructions to send the portions of each of the plurality of sentences to the plurality of respective, human translators, include program instructions to determine the plurality of respective, human translators, based on a rule for geographically separating human translators assigned to translate the portions.

12. The computer system of claim 9, wherein the fourth program instructions to send the portions of each of the plurality of sentences to the plurality of respective, human translators, comprise:
program instructions to detect a presence of potential human translators at translation systems; and
program instructions to use the presence of potential human translators detected from the translation systems to determine the plurality of human translators.

13. The computer system of claim 9, wherein the portions of each of the plurality of sentences in the natural-language text document are phrases, wherein metadata is associated with each portion of the plurality of portions that identify a sequence of the each portion.

14. The computer system of claim 9, wherein a requestor requests the translation of the natural-language text document and further comprising:
sixth program instructions to send the consolidated translations of the plurality of sentences to the requestor, wherein the sixth program instructions are stored on the computer-readable storage device and executed by the CPU via the computer-readable memory.

15. The computer system of claim 9, wherein the natural-language text document is encrypted and comprises at least one of text, voice, an audio recording, a document, and video.

16. A computer-readable storage device having computer-readable program instructions stored on the computer-readable storage device, wherein the computer-readable program instructions are executed by a CPU to translate a natural-language text document, wherein the computer-readable program instructions comprise:
computer-readable program instructions for receiving the natural-language text document for translation;
computer-readable program instructions for dividing each of a plurality of sentences in the document into a plurality of portions based on a set of rules that specify how to divide up each of the plurality of sentences based on content of the plurality of sentences, and avoiding disclosure of any of the plurality of sentences in its entirety to a same human translator;
computer-readable program instructions for translating a first portion of the portions of each of the plurality of sentences to form an initially translated first portion, using a translation engine;
computer-readable program instructions for sending the portions of each of the plurality of sentences to a plurality of respective, human translators, for correction and translation, wherein none of the plurality of human translators is sent any of the plurality of sentences in its entirety for translation, wherein the computer-readable program instructions for sending the portions of each of the plurality of sentences to the plurality of respective, human translators, include computer-readable program instructions for sending the initially translated first portion along with the first portion; and
computer-readable program instructions for combining the translations for the respective portions to form consolidated translations for each of the plurality of sentences in response to receiving translations from the plurality of human translators for respective portions of each of the plurality of sentences, and updating at least one model used by the translation engine based on corrections made by the human translators.

17. The computer-readable storage device of claim 16, wherein the computer-readable program instructions further comprise:
computer-readable program instructions for removing user data from the natural-language text document based on the set of rules prior to sending the plurality of sentences to the plurality of human translators.

18. The computer-readable storage device of claim 16, wherein the computer-readable program instructions for sending the portions of each of the plurality of sentences to the plurality of respective, human translators, so that none of the plurality of human translators is sent any of the plurality of sentences in its entirety for translation include computer-readable program instructions for first determining the respective, human translators, based on a rule for geographically separating human translators assigned to translate the portions.

19. The computer-readable storage device of claim 16, wherein the computer-readable program instructions for sending the portions of each of the plurality of sentences to the plurality of respective, human translators, comprise:
computer-readable program instructions for detecting a presence of potential human translators at translation systems; and computer-readable program instructions for using the presence of potential human translators detected from the translation systems to determine the plurality of human translators.

20. The computer-readable storage device of claim 16, wherein the portions of each of the plurality of sentences in the natural-language text document are phrases, wherein metadata is associated with each portion of the plurality of portions that identify a sequence of the each portion.

21. The computer-readable storage device of claim 16, wherein a requestor requests the translation of the natural-language text document, and wherein the computer-readable program instructions further comprise:
  computer-readable program instructions for sending the consolidated translations of the plurality of sentences to the requestor.

22. The computer-readable storage device of claim 16, wherein the natural-language text document is encrypted and comprises at least one of text, voice, an audio recording, a document, and video.

* * * * *